United States Patent [19]
de Angeli

[11] Patent Number: 5,180,088
[45] Date of Patent: Jan. 19, 1993

[54] ADAPTER FOR RECEIVING RECTANGULAR BEVERAGE CONTAINERS

[76] Inventor: Vicki de Angeli, 10802 Coopersmith Ct., N. Potomac, Md. 20878

[21] Appl. No.: 805,614

[22] Filed: Dec. 12, 1991

[51] Int. Cl.$^5$ .................. B60R 7/00; B65D 25/00
[52] U.S. Cl. .................. 224/42.42; 224/42.45 R; 224/42.43; 248/311.2; 229/1.5 H; 220/411; 220/703; 220/711; 220/737; 220/740; 220/DIG. 13
[58] Field of Search ........... 224/42.42, 42.45 R, 224/42.43, 42.44; 229/1.5 H; 220/703, 711, 713, 737, 738, DIG. 13, 411, 740; 248/311.2, 314

[56] References Cited

U.S. PATENT DOCUMENTS

| | | | |
|---|---|---|---|
| 3,405,862 | 10/1968 | Spyra | 220/306 X |
| 3,578,051 | 5/1971 | Hammon | 220/306 |
| 4,728,018 | 3/1988 | Parker | 224/273 |
| 4,749,112 | 6/1988 | Harper | 224/42.45 R |
| 4,826,058 | 5/1989 | Nakayama | 224/42.44 |
| 4,854,468 | 8/1989 | Dahlquist, II et al. | 220/737 |
| 4,902,061 | 2/1990 | Plavetich et al. | 296/37.12 |
| 4,953,772 | 9/1990 | Phifer | 224/282 |
| 4,974,744 | 12/1990 | Shanklin et al. | 220/278 |
| 4,976,385 | 12/1990 | Matsumoto | 224/42.42 |
| 4,986,435 | 1/1991 | Wright | 220/737 |
| 5,052,649 | 10/1991 | Hunnicutt | 248/311.2 |
| 5,088,673 | 2/1992 | Chandler | 248/311.2 |
| 5,105,976 | 4/1992 | Patterson | 220/711 |

Primary Examiner—Allan N. Shoap
Assistant Examiner—Vanessa Caretto
Attorney, Agent, or Firm—Michael de Angeli

[57] ABSTRACT

An adapter for receiving a rectangular beverage container such as a "juice box" or the like and supporting the same stably within a cylindrical recess or circular aperture of a beverage holder comprises a cylindrical lower section for resting within the beverage holder, a transition section, and a rectangular upper section including a rectangular recess for receiving the rectangular beverage container. The adapter may be inexpensively molded as a tubular member of plastic material. The adapter may be supplied in connection with a cap adapted to be releasably affixed to the adapter, to provide a squeeze-preventing shell for a juice box or the like.

10 Claims, 1 Drawing Sheet

ADAPTER FOR RECEIVING RECTANGULAR BEVERAGE CONTAINERS

BACKGROUND OF THE INVENTION

1. Field of the Invention

This invention relates to an adapter for receiving a rectangular beverage container and for securely supporting the rectangular beverage container in a circular aperture or cylindrical recess.

2. Discussion of the Prior Art

In recent years, automobile manufacturers have increasingly tended to provide beverage holders in automobile and truck interiors. Aftermarket accessories including such beverage holders are also sold for use in automobiles and trucks. Such beverage holders are commonly provided in planar horizontal surfaces, in drawers, or in folding shelves. The beverage holders may comprise circular apertures in horizontal planar members (see U.S. Pat. No. 4,826,058 to Nakayama). Alternatively, such beverage holders may be partly circular apertures in horizontal members (see U.S. Pat. No. 4,728,018 to Parker), or cylindrical recesses in horizontal members (see U.S. Pat. No. 4,902,061 to Plavetich et al).

Such beverage holders are generally sized to receive snugly a conventional 12 ounce beverage can approximately $2\frac{5}{8}$ inches in diameter, or a conical cup of approximately the same mean diameter. Such beverage holders are convenient, particularly to the parents of small children; in particular, spillage of the beverage during driving is reduced if the consumer places the beverage container in the beverage holder when not drinking from it. However, such beverage holders are only useful when the beverage container of interest fits snugly within the beverage holder.

In recent years it has become increasingly popular to sell fruit juices and other such drinks in rectangular disposable containers of waxed paperboard or similar materials. Such containers are referred to commonly and herein as "juice boxes". Such juice boxes are typically rectangular containers on the order of $4\frac{1}{4}$ inches high, $1\frac{5}{8}$ inches deep and $2\frac{5}{8}$ inches long. Typically a small aperture in the material of the upper surface of the juice box is covered only with foil, and a drinking straw is packaged with the juice box. A child or parent can then puncture the foil at the aperture with the straw, allowing the child to drink the beverage. Such juice boxes are conveniently sized for small children and are very popular. However, their dimensions are such that they do not fit within the typical beverage holders provided as part of many modern automobiles or as aftermarket accessories.

One defect of juice boxes is that by squeezing the box, the child can squirt juice out the aperture provided for the straw or out the straw if one is provided. Obviously this can be messy and if not cleaned up promptly may leave a permanent stain. Accordingly, there have also been sold juice box "shells", which are typically two-piece plastic enclosures adapted to receive a juice box. The plastic of the shell is sufficiently rigid to resist squeezing by a child. In use, the parent opens the shell, inserts the juice box, closes the shell by snapping a cap shut or placing an upper shell portion over a lower shell portion, and inserts the straw through the foil. Such juice box shells are particularly useful with younger children.

While such juice box shells are useful to reduce spillage of beverages by squeezing a juice box, their use exacerbates the inability of typical beverage holders to receive a juice box, as the juice box shell increases the overall dimensions of the juice box by at least the thickness of the walls of the juice box shell. Thus, spillage due to squirting of the juice from the juice box may be eliminated by using a juice box shell, but spillage due to tipping over of the juice box may still occur due to the inability of the typical beverage holder to receive a juice box, with or without a shell.

OBJECTS AND SUMMARY OF THE INVENTION

It is therefore an object of the invention to provide an adapter whereby the conventional beverage holder of an automobile or the like may receive a rectangular beverage container, such as a juice box, with or without a juice box shell.

It is a further object of the invention to provide an adapter as specified above in combination with a cap, the combination comprising a juice box shell, so that the adapter can be supported in the conventional beverage holder of a typical vehicle and also prevent spillage of the beverage due to squeezing of the juice box.

The adapter of the present invention may comprise a tubular molded plastic member having a cylindrical lower section for fitting within a beverage holder, a transition section and a rectangular open upper section for receiving a juice box. The transition section may comprise a conical portion for being snugly received within cylindrical apertures varying somewhat in overall diameter. The adapter may be supplied with a cap having a generally rectangular cross section for fitting over the rectangular open upper section of the adapter so that the adapter and the cap together serve as a juice box shell. The cap and the adapter may comprise cooperating finger-actuated catches to retain the cap on the adapter when used as a juice box shell.

BRIEF DESCRIPTION OF THE DRAWING

The invention will be better understood if reference is made to the accompanying drawing, in which the sole

DESCRIPTION OF THE PREFERRED EMBODIMENTS

Figure 1:
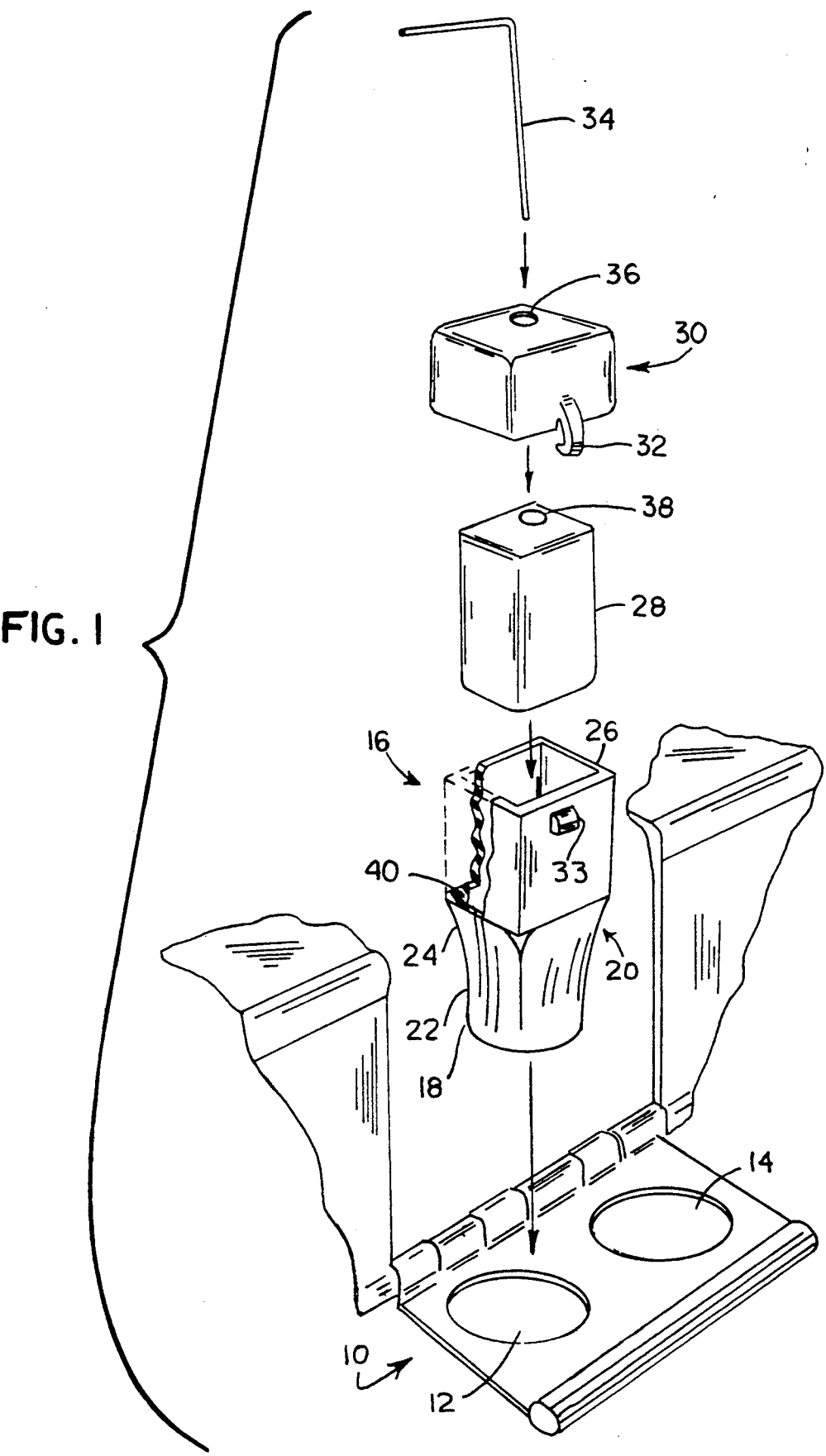
FIG. 1 is an exploded perspective view of the adapter of the invention showing its manner of use.

FIG. 1 indicates at 10 a conventional beverage holder of a vehicle, comprising a fold down shelf having two circular apertures 12 and 14 therein. As is well known, such beverage holders may also comprise cylindrical recesses or partly circular apertures, as shown in the Parker patent referred to above.

The adapter 16 according to the invention is a generally tubular member having a lowermost cylindrical section 18 typically of about $2\frac{5}{8}$ inches diameter to fit within the aperture 12 of a typical beverage holder 10. The adapter 16 includes a transition section 20 which may include a lower conical section 22, to ensure a snug fit in circular apertures varying somewhat in diameter, and an upper round-to-rectangular section 24. The adapter 16 also includes an upper rectangular section 26 sized to receive snugly a conventional juice box 28, which may be contained within a conventional juice box shell (not shown). Typical internal dimensions of the upper rectangular portion 26 may be $1\frac{7}{8}$ inches long by $2\frac{7}{8}$ inches wide.

The rectangular section 26 of the adapter 16 should be sufficiently deep to allow a juice box 28 to rest securely therein; the typical depth of the rectangular section 26 of the adapter 16 may be approximately 1½ inches. The adapter 16 may include internal ledges 40 on which the juice box 28 may rest, preventing the juice box 28 from becoming wedged into the adapter 16.

If it is desired to enclose the juice box 28 entirely, so as to form a shell resisting squeezing of the juice box 28, a cap member 30 may also be provided together with the adapter 16. The cap member 30 is also rectangular in section, and is sized to fit over the rectangular section 26 of the adapter 16. The cap 30 may be provided with catches 32 mating with retainers 33 on the opposite sides of the rectangular section 26, so that a small child will be prevented from removing the cap 30 and removing the juice box 28 from the adapter 16.

The assembly is completed by a straw 34 inserted through an aperture 38 in the outer container of the juice box 28 and through a mating aperture 36 in the cap 30, if used. Typically the aperture 38 in the juice box 28 will be covered by foil so as to be readily punctured by the straw 34.

The adapter 16 and the cap 30, if used, may both be manufactured inexpensively of low cost plastic materials. The adapter 16 may be marketed separately or in conjunction with the cap 30. Parents with younger children may wish to employ the cap 30 to prevent squeezing of the juice box 28 whereas parents with older children may not find this necessary. Of course, the combination of the adapter 16 and the cap 30 may be used simply as a juice box shell, that is, other than in conjunction with a beverage holder 10 of an automobile or the like.

Having described preferred and alternative embodiments of a new and improved adapter for receiving rectangular beverage containers, it is believed that other modifications, variations and changes will be suggested to those skilled in the art in view of the teachings set forth herein. In particular, the specific dimensions given above are exemplary only and are not to be taken as limitations on the invention. It is therefore to be understood that all such variations, modifications and changes are believed to fall with the scope of the present invention as defined by the appended claims.

What is claimed is:

1. An adapter for receiving a rectangular beverage container and stably supporting the same in a beverage holder of a vehicle or the like, comprising:
   a cylindrical lower section having upper and lower ends, said lower end being sized to fit within a beverage holder of an automobile or the like;
   a central transition section having upper and lower ends, said transition section being connected at its lower end to said upper end of said cylindrical lower section; and
   a rectangular upper section having upper and lower ends, and being connected at its lower end to said upper end of said transition section, said rectangular section being open at said upper end thereof to define a rectangular recess to receive a rectangular beverage container of predetermined dimensions.

2. The adapter of claim 1, wherein said adapter is integrally molded of a plastic material.

3. The adapter of claim 1, wherein said transition section comprises a lower conical section and an upper cylindrical-to-rectangular section whereby said cylindrical lower section is joined to said rectangular upper section.

4. In combination, the adapter of claim 1, and a cap member adapted to fit over said upper end of said rectangular upper section of said adapter and be secured thereto, to retain a rectangular beverage container therewithin.

5. The combination of claim 4, wherein both said cap member and said adapter are molded of a plastic material.

6. The combination of claim 5, wherein said cap and said adapter comprise interfitting retainer means whereby said cap may be selectively retained on said adapter.

7. The adapter of claim 1, wherein said lower cylindrical section of said adapter has an outer diameter of approximately 2⅜ inches.

8. The adapter of claim 1, wherein said rectangular section of said adapter has internal transverse dimensions of approximately 1⅞ by 2⅞ inches.

9. The adapter of claim 1, wherein said adapter is generally tubular.

10. The adapter of claim 1, wherein ledges on which said rectangular beverage container may rest, are formed on internal surfaces of said adapter at said lower end of said rectangular recess in said upper section.

* * * * *